May 20, 1924.
E. P. CLARK
CAMERA
Filed Nov. 23, 1920
1,494,665
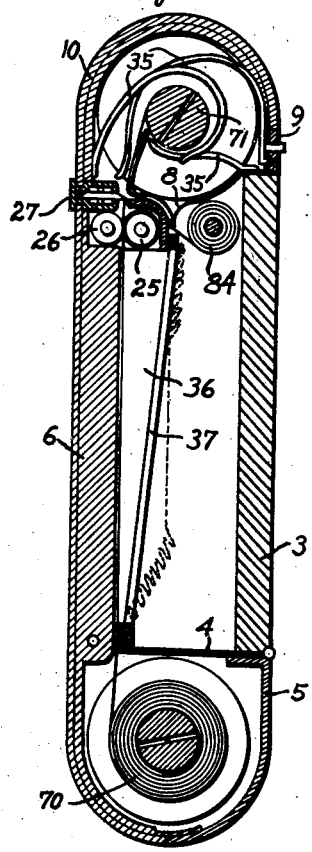
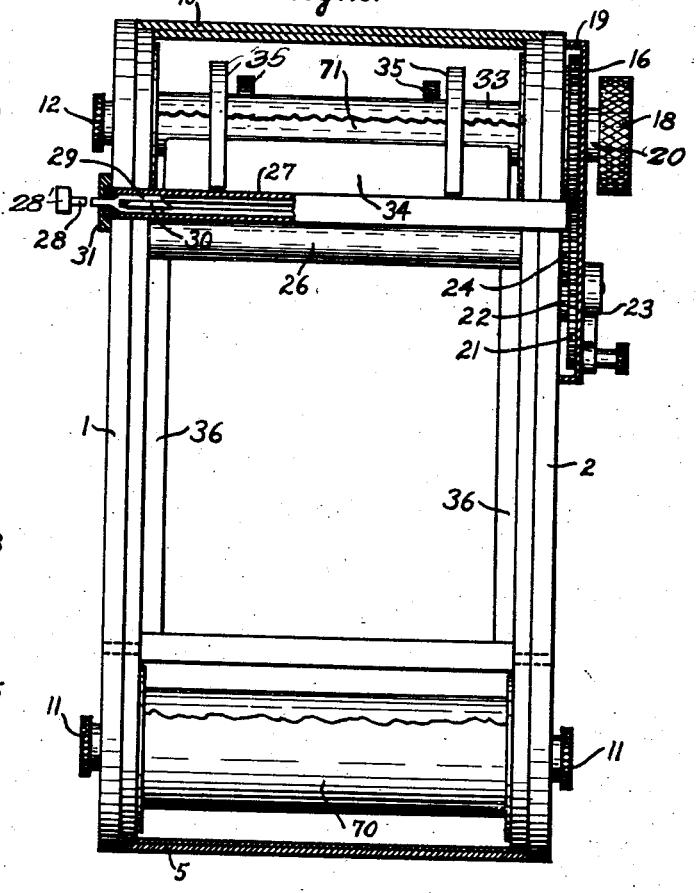
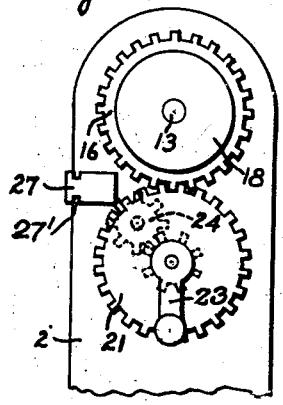
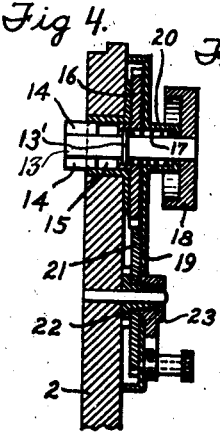
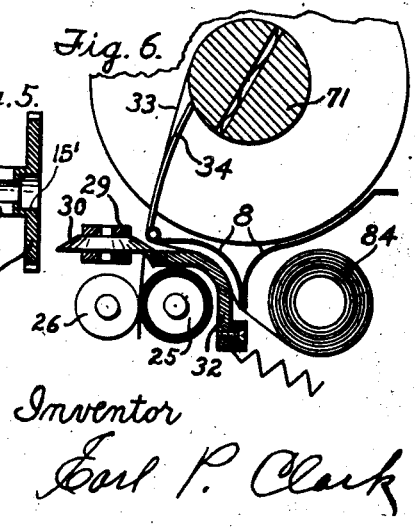
Inventor
Earl P. Clark Patented May 20, 1924.

1,494,665

UNITED STATES PATENT OFFICE.

EARL P. CLARK, OF IOWA CITY, IOWA, ASSIGNOR OF ONE-HALF TO BRUNO A. KRAFFT, OF SAN FRANCISCO, CALIFORNIA.

CAMERA.

Application filed November 23, 1920. Serial No. 425,975.

*To all whom it may concern:*

Be it known that I, EARL P. CLARK, a citizen of the United States, residing at Iowa City, in the State of Iowa, have invented a new and useful Camera, of which the following is a specification.

This invention relates to cameras of the roll-film type, and has for its special object to provide such a camera with means operable by daylight whereby the exposed portion of the film may be cut off and removed from the camera and an empty receiving roll put in the place thereof to enable additional pictures to be taken thereafter.

I attain this object by the mechanism shown on the accompanying drawing in which:

Fig. 1 is a side view of the camera in cross section;

Fig. 2 is a rear view of the camera, partly in cross section;

Fig. 3 is a side view of a portion of the operating mechanism, with the cover plate removed;

Fig. 4 is a view, in cross section, at right angles to Fig. 3;

Fig. 5 is a side view in cross section of the clutch gear;

Fig. 6 is an enlarged side view, partly in cross section, showing certain parts of the interior mechanism.

The side walls, 1 and 2, are preferably of wood. Any suitable form of swinging front 3 may be used. The partition 4 and the outer wall 5, together with the removable back 6 are arranged between the side walls to form a light-proof enclosure for the roll 70 of unexposed film, while the partition 8, front wall 9, removable cap 10, and the various parts of the operating mechanism form a light-proof enclosure for the receiving roll 71.

The roll of unexposed film is positioned between plain centers 11 whereas the receiving roll is positioned between a plain center 12 and a clutch center 13. The clutch center is composed of a central stem with lateral ribs 14 and a bifurcated sleeve 15 within which the central stem is slidably but nonrotatably disposed. The sleeve 15 has formed integral therewith a gear 16 which has an enlarged central opening 15' to receive the collar 13' on the stem of the clutch center 13 against which a coiled spring 17 bears. A hand-wheel 18 is secured to the outer end of the clutch center so as to permit manual operation thereof. A casing 19 is arranged to form a cover for the gear 16, and is provided with a boss 20 to receive the spring 17. A gear 21 of the same size as the gear 16 is arranged just below the same to mesh therewith and is frictionally held between a pinion 22 and a handle 23 which has a threaded hub portion adapted to be screwed upon a threaded boss on the pinion 22 so as to frictionally hold the gear 21. The pinion 22 meshes with and rotates another pinion 24 on the end of a rubber-covered roller 25 which bears against an idle roller 26 for feeding the film forwards when it is passed between these two rollers.

Just above the idle roller is a guidebar 27 which extends from one side to the other of the camera and contains within it a bar 28 which has a bifurcated end 29 in which is journaled a disk cutter 30. The outer end of the bar 28 projects through the open end of the guidebar 27 on the side of the camera, and also through a packed cap 31 forming a light-proof closure. A knob 28' or other convenient form of handle may be formed on the outer end of the bar 28. On its outer sides the guidebar 27 may be formed with grooves 27' to receive the adjacent edges of the removable back 6 and the removable cap 10.

A steel blade 32, curved in cross section, is arranged along the guidebar 27 so as to be engaged by the disk-cutter 30 while the latter is moved along the guidebar, so as to cut off the film. The guidebar is formed sufficiently long at one end thereof to enable the disk cutter to be moved entirely out of the path of the film. The blade 32 has a curved outer surface which is slightly spaced from the adjacent portion of the partition 8 so as to leave a narrow passage therebetween, through which is passed a band of paper 33 from a roll 84 on the outside of the camera. After leaving this narrow passage the paper passes over a plate 34 hinged to the edge of the partition 8, and from thence onto the receiving roll 71. Spring fingers 35 are arranged in any convenient way for guiding the cut-off end of the film around the roll 71 to the under side thereof, and into the converging space between the band of paper 33 and the surface of the roll 71 so as to be taken up by the latter as it is rotated.

Triangular pieces of wood 36 are secured to the inner side walls of the camera to aid in guiding the film, and a rectangular metal frame 37 is screwed to the edges of these pieces, as well as to the edge of the blade 32 and the partition 4 for securing the leather bellows.

In order to wind up the film from the last exposure, the operator may use either the hand wheel 18 or the handle 23, preferably the latter. The feeding roller 25 is of such a diameter that it will require an integral number of revolutions to wind up the length of one picture. When the exposed portion of the film is to be cut off, the knife 30 is drawn across the same and pushed back in place. The receiving roll 71 is then given several revolutions to cover the film with several layers of paper, while the feeding roller is held against rotation. The cap 10 is then taken off and the roller 71 replaced by an empty one, the paper 33 being torn off from the former roller and inserted into the slit of the empty one. The hand wheel 18 is then given a slight turn so as to take up any slack in the band of paper 33, and the cap 10 is replaced. The camera is then ready for taking more pictures.

Claims:

1. A roll-film camera comprising a clutch for rotating a receiving roll, a roller for feeding the exposed portion of the film to the receiving roll, means for rotating said roller, yielding means tending to rotate the clutch when the feeding roller is rotated, a knife edge adjacent the feeding roller, a guide adjacent and parallel to the knife edge, a travelling knife carried by the guide, yieldable guiding fingers for guiding the cut-off end of the film to the receiving roll, means for guiding a band of paper to the receiving roll, means forming a light-proof cover for the unexposed portion of the film and detachable from the camera so as to permit the insertion of a roll of film, and means, in addition to the aforesaid means, for forming a light-proof cover for the exposed portion of the film and detachable from the camera so as to permit the removal of the exposed portion of the film by daylight without admitting light to the unexposed portion of the film.

2. In a roll-film camera, a feeding roller adapted to bear against the film, a knife edge adjacent and parallel to the roller, a travelling knife, means for guiding the knife along the knife edge to cut off the film, a clutch for rotating a receiving roll, means for guiding the cut-off end of the film and a band of paper to the receiving roll, yieldable gearing connecting the feeding roller and the clutch, and means for actuating said gearing.

3. In a roll-film camera, a feeding roller arranged to bear against the film, a knife edge adjacent and parallel to the roller, guiding means adjacent and parallel to the knife edge, a bar slidable in the guiding means and carrying a knife on the end thereof, for cutting off the film when the knife is moved along the knife edge, a disengageable clutch for rotating a receiving roll, means for supplying a band of paper to the receiving roll, resilient fingers for guiding the cut-off end of the film to the receiving roll, geared connections between the feeding roller and the clutch for rotating one of said elements when the other is rotated, said geared connections comprising a yielding element, and means for actuating said geared connections.

4. A roll film camera comprising a framework for supporting a film spool and a rewinding spool, means for guiding a continuous strip of sensitive film from the film spool to the rewinding spool, means for rotating the rewinding spool, means for guiding a separate band of light-insulating material to the rewinding spool to be wound thereon together with the exposed portion of the sensitive film, means operable from the outside of the camera to sever only the exposed portion of the film while leaving the band of light-insulating material intact, and means operatively connected with the means for rotating the rewinding spool for taking up the free end of the film from the film spool.

5. A roll film camera comprising a framework for supporting a film spool and a rewinding spool, means for guiding a continuous strip of sensitive film from the film spool to the rewinding spool, means for rotating the rewinding spool, means for guiding a separate band of light insulating material to the rewinding spool to be wound thereon together with the exposed portion of the sensitive film, means operable from the outside of the camera to sever only the exposed portion of the film while leaving the band of light-insulating material intact, and yieldable gearing operatively connected with the means for rotating the rewinding spool for taking up the free end of the film from the film spool.

6. A roll film camera comprising a framework for supporting a film spool and a rewinding spool, means for guiding a strip of sensitive film from the film spool to the rewinding spool, a bar extending transversely across the film adjacent the rewinding spool, a knife edge on the other side of the film, a rotatable cutting disk cooperating with the knife edge to sever the film, and means slidable along said transverse bar for moving said cutting disk along said knife edge.

EARL P. CLARK.